March 17, 1925. 1,530,360
E. D. HAGEN
COMBINED AUTOMOBILE BUMPER AND BED
Filed July 10, 1924   2 Sheets-Sheet 2
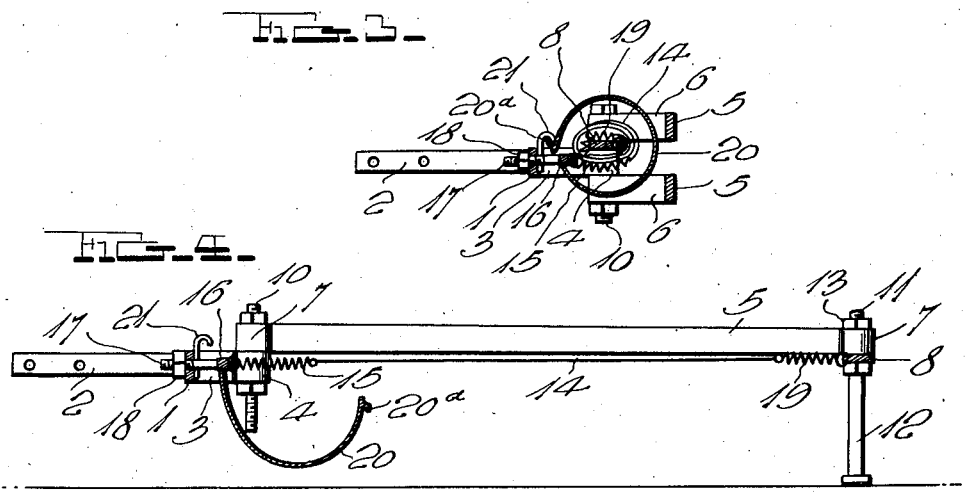
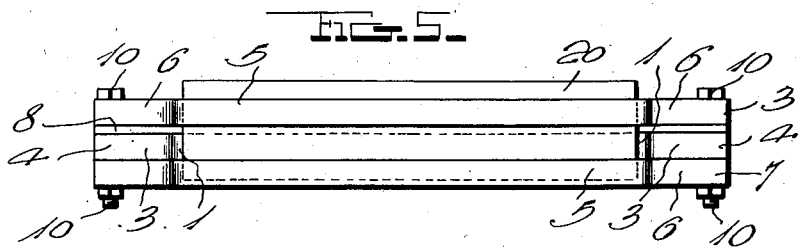
Inventor
E. D. Hagen
Witness
H. Woodard
By H. B. Wilson & Co.
Attorneys Patented Mar. 17, 1925.

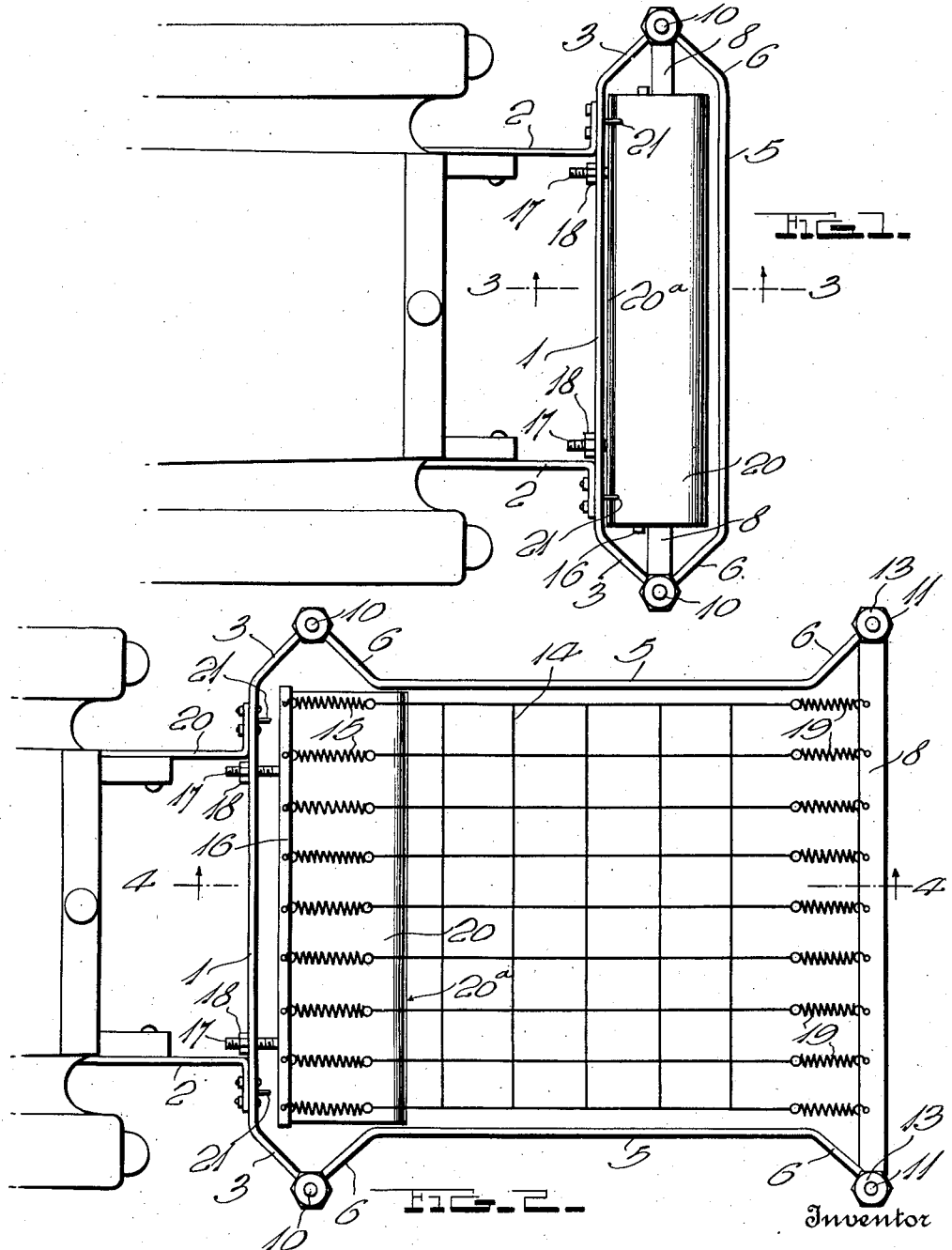

1,530,360

UNITED STATES PATENT OFFICE.

ELMER D. HAGEN, OF SILVERTON, OREGON.

COMBINED AUTOMOBILE BUMPER AND BED.

Application filed July 10, 1924. Serial No. 725,283.

*To all whom it may concern:*

Be it known that I, ELMER D. HAGEN, a citizen of the United States, residing at Silverton, in the county of Marion and State of Oregon, have invented certain new and useful Improvements in a Combined Automobile Bumper and Bed; and I do declare the following to be a full, clear, and exact description of the invention, such as will enable others skilled in the art to which it appertains to make and use the same.

My invention aims to provide a simple and inexpensive, yet a very desirable attachment for automobiles, which is readily convertible for use as a bumper, or as a bed upon which the occupants of the machine may sleep.

In the preferred form of construction, the bed spring or any other sling which may be employed, is preferably rolled up and confined between parts of the frame structure, when the device is conditioned for use as a bumper, and a further object is to provide a unique covering sheath for the rolled spring and any bed covers which might be rolled therewith.

With the foregoing in view, the invention resides in the novel subject matter hereinafter described and claimed, the description being supplemented by the accompanying drawings.

Figure 1 is a top plan view showing the device in condition for use as a bumper.

Figure 2 is a top plan illustrating the device extended for use as a bed.

Figures 3 and 4 are vertical sectional views as indicated by lines 3—3 and 4—4 of Figs. 1 and 2, respectively.

Figure 5 is a front elevation of the device when used as a bumper.

Figure 6 is a perspective view of the covering sheath for the rolled sling.

Figure 7 is a perspective view of the bar to which the foot of the sling is attached.

Figure 8 is a perspective view of one of the front or bumper bars.

The form of construction selected for illustration in the present application is hereinafter rather specifically described, with the understanding however that it constitutes only one of the many forms in which the invention may be embodied.

The numeral 1 designates a horizontal back bar which is adapted to be connected with either the front or rear end of an automobile, by any suitable attaching means, such as the brackets 2. The bar is shown connected with the front end of the automobile, said bar being provided with forwardly directed ends 3 having vertical eyes 4 at their extremities. A pair of front or bumper bars 5 are disposed in front of the bar 1, in vertically spaced relation, said bars having rearwardly directed ends 6 provided with vertical eyes 7 for disposition over and under the eyes 4. Between the bars 1 and 5, an additional bar 8 extends, said bar 8 having openings 9 in its ends for alinement with the eyes 4 and 7. Vertical bolts 10 pass normally through these aligned eyes and openings to secure the four bars 1, 5—5, and 8 in the assembled position shown in Figs. 1, 3 and 5 to constitute a bumper for the machine.

By releasing the bolts 10, the bar 8 may be detached and the front bars 5 may be projected forwardly from the ends of the bar 1, as shown in Figs. 2 and 4, said bolts being used to then connect the rear ends of said bars 5 with said bar 1, while the front ends of said bars 5 are connected with the ends of the bar 8, by the threaded upper ends 11 of legs 12 which are normally carried in the machine, said upper ends of the legs being passed through the foremost eyes 7 of the bars 5 and through the openings 9 in the bar 8. Nuts 13 are threaded on the upper ends of the legs to securely hold the bars 5 and 8 in proper relation to each other.

A spring 14 or any other desired form of sling, such as one constructed from fabric, is adapted to extend between the back bar 1 and the bar 8 when the latter is in the foremost position shown in Figs. 2 and 4. Preferably, a wire spring is used and it is connected by a plurality of coils 15 with a head bar 16 which is disposed slightly in front of the back bar 1. In the construction shown, threaded studs 17 project rearwardly from the head bar 16 through openings in the bar 1, and nuts 18 are threaded on said studs, so that the spring 14 may be tensioned or released, by adjusting said nuts. Additional coils 19 have been shown connecting the spring 14 with the bar 8, and it may here be stated that when use of the bed is no longer needed, the bar 8 is detached from the bars 5 and the latter are detached from the bar 1. Then, the entire spring 14 is rolled upon the bar 8, as will be clear from Fig. 3. Then, when the parts are resecured in the relative positions shown in Figs. 1, 3 and 5, this spring will be compactly confined between the bars 1 and 5.

To cover and protect the spring 14 and any bed covers which may be rolled therewith, I provide a novel form of sheath. This sheath is preferably formed from a single sheet of spring metal 20 having one of its edges secured to the lower side of the head bar 16. When the spring is rolled, the sheet 20 is passed around it, as shown in Figs. 1 and 3, and suitable means are employed to hold the free edge of the sheet. In the construction shown, a rib 20$^a$ is provided on said free edge, said rib being adapted to hook under a pair of hooks 21 which are carried by the bar 1. The rib is held in engagement with the hooks by the resiliency of the sheet 20.

It will be seen from the foregoing that a simple and inexpensive device has been provided for carrying out the objects of the invention, and as excellent results may be obtained from the showing, it can of course be followed. However, within the scope of the invention as claimed, numerous modifications may be made.

I claim:

1. A combined bumper and bed comprising a back bar, a pair of front bars disposed normally in front of the back bar, means for normally connecting the adjacent ends of the front and back bars and permitting said front bars to be projected forwardly from the ends of the back bars to provide side rails for a bed, an additional bar normally mounted detachably adjacent the other bars, means for connecting the ends of said additional bar to the front ends of said front bars when the latter are forwardly projected, and a sling adapted to extend between said back bar and said additional bar when the latter is in its foremost position.

2. A combined bumper and bed comprising a back bar, a pair of front bars disposed normally in front of the back bar, an additional bar normally extending between the ends of the other bars, bolts at the ends of the four bars to normally secure them together, release of said bolts permitting removal of the additional bar and forward projection of the front bars, means for detachably connecting the ends of said additional bar to the front ends of the front bars when the latter are forwardly projected, and a sling adapted to extend between said back bar and said additional bar when the latter is in its foremost position.

3. A combined bumper and bed comprising a back bar having forwardly directed ends provided with vertical eyes, a pair of front bars disposed normally in front of the back bar and having rearwardly directed ends formed with vertical eyes for alinement with the aforesaid eyes, an additional bar disposed normally between the front and back bars and having openings for alinement with the eyes of said front and back bars, bolts passing normally through said eyes and openings, release of said bolts permitting forward projection of said front bars from the ends of the back bar, means for connecting the additional bar to the front ends of the front bars when the latter are forwardly projected, and a sling adapted to extend between said back bar and said additional bar when the latter is in its foremost position.

4. A combined bumper and bed comprising a back bar, a pair of front bars disposed normally in front of the back bar, means for normally connecting the adjacent ends of the front and back bars and permitting said front bars to be projected forwardly from the ends of the back bars to provide side rails for a bed, an additional bar normally mounted detachably adjacent the other bars, detachable legs embodying means for connecting the ends of said additional bar to the front ends of said front bars when the latter are forwardly projected, and a sling adapted to extend between said back bar and said additional bar when the latter is in its foremost position.

5. A combined bumper and bed comprising a back bar having forwardly directed ends provided with vertical eyes, a pair of front bars disposed normally in front of the back bar and having rearwardly directed ends formed with vertical eyes for alinement with the aforesaid eyes, an additional bar disposed normally between the front and back bars and having openings for alinement with the eyes of said front and back bars, bolts passing normally through said eyes and openings, release of said bolts permitting forward projection of said front bars from the ends of the back bar, detachable legs having upper extremities for passage through the openings of the additional bar and through the front eyes of said front bars when the latter are projected forwardly, and a sling adapted to extend between said back bar and said additional bar when the latter is in its foremost position.

6. A structure as specified in claim 1; said sling being normally rolled on said bar, and a sheath adapted to extend around the rolled sling.

7. A structure as specified in claim 3; said sling being normally rolled on said additional bar and confined between the front and back bars, and a sheath for covering the rolled sling.

8. A combined bed and bumper comprising a stationary bar, a sling connected at one end thereto and adapted to be rolled and disposed adjacent said bar, a flexible metal sheet connected at one edge to said bar and adapted for passage around the rolled sling, and means for releasably holding the other edge of said sheet.

In testimony whereof I have hereunto affixed my signature.

ELMER D. HAGEN.